United States Patent [19]

Yamada et al.

[11] Patent Number: 4,950,314
[45] Date of Patent: Aug. 21, 1990

[54] GAS SEPARATION MEMBRANE

[75] Inventors: Shinichi Yamada; Kuniyasu Shiro, both of Ootsu, Japan

[73] Assignee: Toray Industries Inc., Tokyo, Japan

[21] Appl. No.: 319,801

[22] Filed: Mar. 7, 1989

Related U.S. Application Data

[63] Continuation of Ser. No. 85,193, Aug. 14, 1987, abandoned.

[30] Foreign Application Priority Data

| Aug. 14, 1986 | [JP] | Japan | 61-190930 |
| Sep. 12, 1986 | [JP] | Japan | 61-214034 |
| Oct. 3, 1986 | [JP] | Japan | 61-234428 |

[51] Int. Cl.$^5$ ............ B01D 53/22; B01D 71/24
[52] U.S. Cl. ............................. 55/158; 55/16
[58] Field of Search ..................... 55/16, 68, 158

[56] References Cited

U.S. PATENT DOCUMENTS

| 3,350,844 | 11/1967 | Robb | 55/16 |
| 4,132,824 | 1/1979 | Kimura et al. | 55/158 X |
| 4,280,970 | 7/1981 | Kesting | 210/650 X |
| 4,292,417 | 9/1981 | Ishii et al. | 525/510 |
| 4,468,500 | 8/1984 | Malon et al. | 55/16 X |
| 4,468,501 | 8/1984 | Zampini et al. | 55/16 X |
| 4,468,502 | 8/1984 | Malon et al. | 55/16 X |
| 4,468,503 | 8/1984 | Zampini et al. | 55/16 X |
| 4,488,886 | 12/1984 | Zampini | 55/158 |
| 4,493,714 | 1/1985 | Ueda et al. | 55/16 |
| 4,530,703 | 7/1985 | Malon et al. | 55/16 |
| 4,551,156 | 11/1985 | Li | 55/16 |
| 4,631,075 | 12/1986 | Yamabe et al. | 55/158 |
| 4,636,229 | 1/1987 | Itoh et al. | 55/158 |
| 4,695,295 | 9/1987 | Dorman et al. | 55/16 |

FOREIGN PATENT DOCUMENTS

| 0080617 | 6/1983 | European Pat. Off. . |
| 0130963 | 1/1985 | European Pat. Off. . |
| 0160435 | 11/1985 | European Pat. Off. . |
| 0181772 | 5/1986 | European Pat. Off. . |
| 0214792 | 3/1987 | European Pat. Off. . |
| 43-025022 | 10/1968 | Japan . |
| 54-146277 | 11/1979 | Japan . |
| 56-028605 | 3/1981 | Japan . |
| 56-040413 | 4/1981 | Japan . |
| 56-91916 | 7/1981 | Japan . |
| 56-092925 | 7/1981 | Japan . |
| 56-092926 | 7/1981 | Japan . |
| 59-032903 | 2/1984 | Japan . |
| 59-059214 | 4/1984 | Japan . |
| 59-069104 | 4/1984 | Japan . |
| 59-112802 | 6/1984 | Japan . |
| 59-030169 | 7/1984 | Japan . |
| 59-186602 | 10/1984 | Japan . |
| 59-222203 | 12/1984 | Japan . |
| 60-051525 | 3/1985 | Japan . |
| 60-071004 | 4/1985 | Japan . |
| 60-175505 | 9/1985 | Japan . |
| 60-216802 | 10/1985 | Japan . |
| 60-257803 | 12/1985 | Japan . |
| 62-007418 | 1/1987 | Japan . |
| 62-030524 | 2/1987 | Japan . |
| 62-053373 | 3/1987 | Japan . |
| 62-216623 | 9/1987 | Japan . |
| 62-216624 | 9/1987 | Japan . |

OTHER PUBLICATIONS

Japanese Abstracts 60-257806, vol. 10, No. 131 (1986).
Hachisuka et al, "Polymer Reprints", Japan vol. 35, No. 3, p. 425, 1986.

*Primary Examiner*—Robert Spitzer
*Attorney, Agent, or Firm*—Birch, Stewart, Kolasch & Birch

[57] ABSTRACT

A gas separation membrane with excellent gas separation properties is disclosed. The gas separation membrane is substantially free from pinholes and consists essentially of a crosslinked polyolefin or a crosslinked polyarylene oxide. This gas separation membrane is produced by evaporating a solution containing a polyolefin or a polyarylene oxide having an active functional group which can form crosslinking site therebetween or which can react with a crosslinking agent to form a crosslinking site.

17 Claims, No Drawings

GAS SEPARATION MEMBRANE

This application is a continuation of application Ser. No. 07/085,193 filed on Aug. 14, 1987, now abandoned.

BACKGROUND OF THE INVENTION

I. Field of the Invention

This invention relates to a gas separation membrane having good gas permeability, selectivity, durability and anti-scratching properties.

II. Background of the Invention

Recently, gas separation by means of a membrane, especially production of oxygen-enriched air by gas separation, has attracted attention. The membrane practically used for the gas separation must have excellent gas-separating properties and a high gas permeability. To satisfy these requirements, various separation membranes have recently been invented by studying the membrane materials, membrane structures, and processes of producing the membranes.

As for the membrane materials, the following are exemplary:

(1) In Japanese Patent Disclosure (Kokai) Nos. 146277/79, 40413/81, 92925/81 and 92926/81, a gas separation membrane consisting essentially of a polyolefin such as poly(4-methyl-1-pentene) or the like, and the production process thereof are disclosed. Further, in Japanese Patent Publication (Kokoku) No. 30169/84, a gas separation membrane formed from a composition consisting essentially of polymethylpentene and polyorganosiloxane/polycarbonate copolymer is disclosed. In Japanese Patent Disclosure (Kokai) No. 28605/81, a gas permeation membrane comprising as the major component an olefin-based macromolecule partially crosslinked with polyorganosiloxane is disclosed.

(2) In Japanese Patent Disclosure (Kokai) No. 32903/84, a separation membrane formed from a modified poly(4-methyl-1-pentene) prepared by graft-copolymerizing an organosilane derivative of an unsaturated carboxylic acid is disclosed.

(3) Japanese Patent Publication (Kokoku) No. 25022/68 teaches a gas separation membrane made of a polyarylene oxide, and Japanese Patent Disclosure (Kokai) No. 216802/85 teaches a gas separation membrane made of a silylated polyphenylene oxide.

(4) As examples in which crosslinked polyarylene oxide is used as a gas separation membrane, Japanese Patent Disclosure (Kokai) Nos. 222203/84 and 53373/87 disclose a gas separation membrane formed from a polyarylene oxide crosslinked by aminoalkyl-substituted polysiloxane, and Japanese Patent Disclosure (Kokai) No. 51525/85 discloses a crosslinked polyarylene oxide membrane prepared by a reaction of a halogenated polyarylene oxide with a crosslinking agent such as ammonia.

(5) The gas permeability of poly(2-trimethoxysilyl-1,3-butadiene) was discussed in Polymer Preprints, Japan 35 (3), 425 (1986).

On the other hand, as for the membrane structures, the following are exemplary:

(6) Japanese Patent Disclosure (Kokai) No. 112802/84 discloses a semipermeable membrane comprising a layer of silicone-based macromolecule and a layer of macromolecule such as polyolefin and polydiene of which the glass transition temperature is not higher than room temperature, and the two layers are supported on a porous support.

(7) Japanese Patent Disclosure (Kokai) No. 59214/84 discloses a semipermeable membrane comprising a first membrane formed on a porous support, which is formed from a material having an oxygen permeability coefficient of $10^{-8}$–$10^{-7}$ ($cm^3 \cdot cm/cm^2 \cdot sec \cdot cmHg$), such as polyorganosiloxane and a second membrane superposed on the first membrane, which is made of a material having a high separation ability of oxygen from nitrogen, such as poly(vinyl pivalate).

However, the above membranes (1) have a low selectivity in separating a particular gas from a gas mixture.

The above membrane material (2) has an improved selectivity, but it has problems in that the strength of the membrane is small and the feasibility of forming a thin film is not good.

As to the above gas separation membranes (3), the polyarylene oxide does not have a crosslinked structure, and so the film-formability and the durability of the membrane are low.

As to the above membranes (4), it is necessary to add a crosslinking agent in a post-treatment step for crosslinking the halogenated polyarylene oxide, so that the production process is complicated.

The above membrane (5) has a low strength and, in particular, reproducible measurement results have not yet been obtained in the glassy state of the membrane material. Further, the measurement results in a rubbery state so that a separation factor $\alpha$ ($=P_{O_2}/P_{N_2}$) of the membrane material is as low as 3.

As to the above semipermeable membranes (6) and (7), since the top layer made of a polymer with high gas separation ability has a low mechanical strength, defects such as pinholes are likely to be produced in the top layer due to the friction when the membrane is wound, or due to the contact with a spacer which is necessary to assure a flow path of the gas when the membrane is incorporated in a module, so that the gas-separation ability thereof is reduced.

SUMMARY OF THE INVENTION

Accordingly, the object of the present invention is to eliminate the above-mentioned drawbacks in the prior art and to provide a gas separation membrane with excellent gas permeability and gas selectivity, great mechanical strength and excellent anti-scratching properties, and which is easy to manufacture.

This invention provides a gas separation membrane consisting essentially of a crosslinked polyolefin or a crosslinked polyarylene oxide, which gas separation membrane is produced by evaporating a solution containing a polyolefin or a polyarylene oxide having an active functional group which can form crosslinking sites therebetween or which can react with a crosslinking agent to form crosslinking sites.

This invention further provides a composite membrane for gas separation comprising a porous support, a first gas permeable layer formed on the porous support, and the above-described gas separation membrane of the present invention.

By the present invention, a gas separation layer with excellent gas permeability and gas selectivity, great mechanical strength, and anti-scratching properties is provided. Further, the gas separation membrane of the present invention is easy to manufacture.

DETAILED DESCRIPTION OF THE PREFERRED EMBODIMENTS

As stated above, the gas separation membrane of the present invention is produced by evaporating the solvent of a solution of a polyolefin or a polyarylene oxide. The polyolefin used in the present invention is preferably made from an olefin having carbon atoms of 2 to 18, and more preferably 2 to 10. Preferred examples of the polyolefin include polymers and copolymers of ethylene; propylene; butene derivatives such as isobutylene, 1-butene, 3-methyl-1-butene and 3-cyclohexyl-1-butene; pentene derivatives such as 1-pentene, 4-methyl-1-pentene and 3-methyl-1-pentene; hexene derivatives such as 1-hexene and 5-methyl-1-hexene; heptene derivatives such as 1-heptene and 5-methyl-1-heptene; octene derivatives such as 1-octene; decene derivatives such as 1-decene; vinylcycloalkane derivatives such as vinyl cyclopentane and vinyl cyclohexane; allylcycloalkane derivatives such as allylcyclohexane; styrene derivatives such as styrene and α-methylstyrene; silicon-containing alkene such as vinyltrimethylsilane and allyltrimethylsilane; internal olefins such as norbornene; fumaric esters such as diisopropyl fumarate, din-propyl fumarate, dicyclohexyl fumarate and dit-butyl fumarate; unsaturated carboxylic esters such as acrylic ester, methacrylic ester and vinyl pivalate. Among these, polymers of α-olefins, especially homopolymers of propylene or 4-methyl-1-pentene, as well as the copolymers of these two olefins with other monomers are preferred since the membrane strength is great. Homopolymers of 4-methyl-1-pentene and copolymers containing 4-methyl-1-pentene as a component are particularly preferred since the semipermeability is excellent. Polydienes such as polybutadiene and polyisoprene are not suitable for gas separation such as oxygen because the anti-oxidation property is bad due to the double bonds in the main chain of the polymer.

The polyolefin which may be employed in the present invention may preferably have a weight-average molecular weight of not less than 10,000, or a degree of polymerization of not less than 100.

The polyarylene oxide used in the present invention has the following formula:

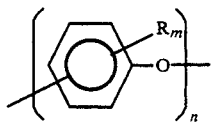

(I)

wherein m means an integer of 1-3, preferably 2, n means an integer of not less than 75, preferably not less than 100, R means, the same or different, alkyl, substituted alkyl, phenyl, substituted phenyl, halogen, alkoxy, alkenyl, alkynyl or amino group. The number of carbon atoms contained in the substituent group R is preferably not more than 15, and more preferably not more than 8. Although the aromatic rings in the main chain of the polymer are preferably bonded to adjacent oxygens in the para position, some of the bonds may be formed in the other positions.

It is required that at least one hydrogen or at least one halogen be bonded to the aromatic ring in the main chain or to a carbon atom bonded to the aromatic ring in the main chain. In particular, when R is alkyl, the carbon atom directly bonded to the aromatic ring in the main chain must have at least one hydrogen. The repeating units in the main chain may be the same or different.

The preferred R is an alkyl group. Examples of the preferred alkyl group include straight and branched alkyl groups such as methyl, ethyl, n-propyl, i-propyl, n-butyl, isobutyl, sec-butyl and n-pentyl. An especially preferred polyarylene oxide is poly(2,6-dimethyl-1,4-phenylene oxide).

The polyarylene oxide may be synthesized by various methods which are well-known in the art. Although not limited thereto, the polyarylene oxide may be synthesized by oxidative coupling polymerization of a substituted phenol monomer corresponding to the above formula; by polycondensation of a halogen-substituted phenol; or by a polymer reaction of the polyarylene oxide.

Those polyarylene oxides in which all or a part of the hydrogen atoms and/or halogen atoms on the aromatic ring in the main chain or on an aliphatic carbon atom directly bonded to the aromatic ring in the main chain are substituted by a non-crosslinking silicon-containing group such as an organosilyl group, organosiloxane group and organosilalkylene group; and those polyarylene oxides in which a non-crosslinking silicon-containing group such as an organosilyl group, organosiloxane group and organosilalkylene group is added to all or a part of an unsaturated bond which may be contained in the polyarylene oxide expressed by the formula (I) above may also be used in the present invention.

The polyarylene oxides containing a silicon atom may be synthesized by various methods well-known in the art. For example, they may be synthesized by a reaction of a metalated polyarylene oxide with organohalosilane, organohalosiloxane or organohalosilalkylene, which metalated polyarylene oxide is prepared from a polyarylene oxide or a halogen-containing polyarylene oxide using an organometallic reagent such as n-butyllithium, sec-butyllithium, tert-butyllithium, phenyllithium, in the presence of, if necessary, an amine such as N,N,N',N'-tetramethylethylenediamine. (Japanese Patent Disclosure (Kokai) Nos. 7418/87 and 30524/87); by hydrosilylation of a polyarylene oxide containing an unsaturated bond in a substituent; or by a reaction between a polyarylene oxide and an organosilane, an organosiloxane, or an organosilalkylene containing a reactive group such as an epoxide, isocyanate and a diazo group.

The substituent(s) on the silicon atom of the organosilyl group, organosiloxane group or organosilalkylene group may preferably be, the same or different, hydrogen, $C_1$-$C_{12}$ alkyl, substituted alkyl, alkenyl, phenyl or substituted phenyl. When the substituent is an alkyl group, the total number of the carbon atoms contained in the substituent(s) on one silicon atom is preferably 2 to 30, and more preferably 2 to 24, in view of the mechanical strength (breaking strength and Young's modulus) of the membrane formed and formability of a thin film.

Preferred examples of the substituent(s) may include hydrogen; alkyl groups such as methyl, ethyl, n-propyl, isopropyl, n-butyl, isobutyl, sec-butyl, tert-butyl, neopentyl, hexyl, octyl and cyclohexyl; substituted alkyl groups such as chloromethyl, chloropropyl, mercaptopropyl, cyanoethyl, benzyl, trichloropropyl, methoxyethyl, nitropropyl, 2-(carbomethoxy)ethyl, dichloromethyl, trifluoropropyl, (perfluorohexyl)ethyl and (perfluorooctyl)ethyl; alkenyl groups such as cyclohexenyl, vinyl and allyl; phenyl group and substituted phenyl groups such as 4-methylphenyl, 4-nitrophenyl, 4-chlorophenyl, 4-methoxyphenyl and pentafluorophenyl.

Examples of the active functional group which autogenically forms a crosslinking sites or which reacts with a crosslinking agent to form a crosslinking site may include an active silyl group, alcohol group, epoxy group, isocyanate group, ester group, amino group, thiol group, unsaturated alkyl group and carboxylic acid anhydride group. In view of the formability of a crosslinked structure, an active silyl group and carboxylic acid anhydride group are preferred. The active silyl group may contain reactive substituent(s) on the silicon atom. Examples of the substituent may include alkoxyl groups such as methoxy, ethoxy, propoxy and propenoxy group; acyloxy groups such as an acetoxy group; oxime groups such as $(CH_3)_2C=NO-$, $C_2H_5CH_3C=NO-$ and $(C_6H_5)_2C=NO-$; substituted amino groups such as alkylamino group; amide groups such as an acetamide group; alkylaminoxy group; halogen; hydroxyl groups; hydrogen; alkenyl groups such as vinyl and allyl groups; alkyl groups and aryl groups having a functional group such as an epoxy group, isocyanate group, amino group, hydroxyl group and thiol group. Preferred active silyl groups include alkoxysilyl, acetoxysilyl and oximesilyl group.

Any crosslinking agent which contains a plurality of functional groups which can perform a condensation reaction, addition reaction or substitution reaction with the active functional group may be used in the present invention. The crosslinking agent may preferably be contained in the solution containing the polyolefin or polyarylene oxide having an active functional group.

The active functional group may be introduced to the polyolefin or polyarylene oxide by various methods which are well-known in the art. Examples of the methods include copolymerization of the olefin or substituted phenol with a monomer containing the active functional group; and a grafting method in which a side chain containing the active functional group is introduced into the polymer. The grafting method may be conducted by reacting an unsaturated compound having the active functional group in a dissolved state or in a fused state with the polymer in the presence of, if necessary, a radical initiator such as organic peroxide; or by reacting a reagent having the active functional group with a metalated polymer prepared by using an organometal reagent such as n-butyllithium, sec-butyllithium, tert-butyllithium, phenyllithium or the like.

When the active functional group is an active silyl group and the polymer is a polyolefin, the active silyl group may preferably be introduced into the polymer by grafting an unsaturated compound containing the active silyl group. Examples of the unsaturated compound may include vinyltrimethoxysilane, vinyldimethylmethoxysilane, vinyltriethoxysilane, vinylmethyldiethoxysilane, vinyldimethylethoxysilane, vinyltriisopropoxysilane, vinyltriacetoxysilane, vinylmethyldiacetoxysilane and vinylmethylbis(methylethylketoxime)silane.

When the active functional group is an active silyl group and the polymer is a polyarylene oxide, the active silyl group may preferably be introduced into the polymer by reacting a reagent containing the active silyl group with a metalated polyarylene oxide prepared by using the above-mentioned organometal reagent. The examples of the reagent containing the active silyl group may include halogen-containing compounds such as methoxydimethylchlorosilane, dimethoxymethylchlorosilane, trimethoxychlorosilane, ethoxydimethylchlorosilane, diethoxymethylchlorosilane, triethoxychlorosilane and phenyldimethoxychlorosilane; epoxy compounds such as γ-glycidoxypropyltrimethoxysilane and γ-glycidoxypropylmethyldiethoxysilane; hydrosilane compounds such as trimethoxysilane, triethoxysilane, dimethoxymethylsilane, diethoxymethylsilane, tris(2-propanoneoxime)silane and tris(2-butanoneoxime)silane; and vinylsilane compounds such as vinyltrimethoxysilane, vinyltriethoxysilane, vinylmethyldimethoxysilane, vinylethyldimethoxysilane, vinyltriacetoxysilane, vinyltris(2-propanoneoxime)silane and vinyltris(2-butanoneoxime)silane.

When the active functional group is a carboxylic acid anhydride group and the polymer is a polyolefin, it is preferred to react an unsaturated carboxylic acid anhydride such as maleic anhydride with the polyolefin in the presence of a radical initiator such as organic peroxide.

The amount of the functional group in the polyolefin or polyarylene oxide may widely vary depending on the nature of the functional group, the polymer and the conditions of crosslinking. In particular, when the active functional group is an active silyl group and the polymer is a polyolefin, the amount of the active silyl group in the polyolefin is preferably 0.005 to 12% by weight, more preferably 0.05 to 5% by weight in terms of the silicon content. When the active functional group is an active silyl group and the polymer is a polyarylene oxide, the amount of the active silyl group in the polyarylene oxide is preferably 0.005 to 12% by weight, more preferably 0.05 to 10% by weight in terms of the silicon content. When the active functional group is a carboxylic acid anhydride group and the polymer is a polyolefin, the amount of the carboxylic acid anhydride group in the polyolefin is preferably 0.01 to 10 mol %, more preferably 0.1 to 5 mol % in terms of the molar fraction thereof.

The solvent used in the present invention is a good solvent of the polymer which does not dissolve the porous support, and so should be selected depending on the porous support. When the porous support is a polysulfone porous support or a polyimide porous support, preferred examples of the solvent include cyclohexane, cyclohexene and chloroform.

To obtain a membrane free from pinholes, it is preferred to dilute the solution containing the polymer having the active functional group with a second solvent having low surface tension to obtain a uniform solution. Preferred examples of the second solvent include trichlorotrifluoroethane, trichlorofluoromethane, isopentane, dimethyl ether and diethyl ether.

The solution containing the polyolefin or polyarylene oxide is directly applied on the porous support or on a first thin layer consisting essentially of a polymer having a high gas permeability which is formed on a porous support, and then the solvent is evaporated to form a thin layer. Alternatively, the solution is cast on the surface of water and then the solvent is evaporated.

The crosslinking reaction proceeds during the evaporation of the solvent. Upon the completion of the evaporation, a thin layer containing crosslinking bonds, which has an excellent mechanical strength and excellent gas separation properties, and is free from pinholes may be formed. The crosslinking bonds are formed between the active functional groups in the polymer, or between the active functional group and the crosslinking agent. In cases in which the active functional group is an active silyl group, the crosslinking site is formed by a bond containing a silicon atom, and preferably by an oligosiloxane bond. More particularly, the active silyl group contains a substituent group which can be hydrolyzed, such as an alkoxy group, acyloxy group and oxime group, and the crosslinking site is formed by the condensation of silanol groups or the like derived from the substituent group. To effectively conduct the crosslinking reaction, it is preferred that a crosslinking catalyst be added to the solution, and/or that water (including moisture in the air) exist under the crosslinking reaction. Preferred examples of the crosslinking catalyst include organotins such as dibutyltin dilaurate, dibutyltin dioctanoate, dibutyltin diacetate and stannous octanoate; salts of carboxylic acid such as iron 2-ethylhexanoate and cobalt naphthenate; organometal compounds such as titanic acid ester; organic amines such as ethylamine, dibutylamine and pyridine; and acids such as fatty acids. Among these, especially preferred are dibutyltin dilaurate, dibutyltin octanoate, dibutyltin diacetate and stannous octanoate. The evaporation of the solvent may be effected at room temperature to 200° C., and the evaporation may preferably be conducted at 50° C. to 150° C.

In a preferred mode of the present invention, the gas separation membrane has crosslinking sites formed by an oligosiloxane bond of the formula:

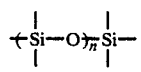
(II)

(wherein n is an integer.)

In view of the selectivity of the separation, the integer n is preferably 1 to 3, and more preferably 1. More particularly, the preferred crosslinking bond is an oligosiloxane bond of the formula:

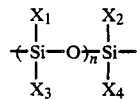
(III)

(wherein $X_1$, $X_2$, $X_3$ and $X_4$ independently means OSi, alkyl, aryl, alkoxy, acetoxy, oxime or a hydroxyl group) The crosslinking moiety containing an oligosiloxane bond also may include other bonds which can be used to form organic or inorganic macromolecules, such as a carbon-carbon bond, carbon-oxygen bond, carbon-nitrogen bond, carbon-sulfur bond, carbon-silicon bond, ester bond, amide bond, urethane bond and urea bond may be employed for forming the crosslinked structure.

The gas separation membrane of the present invention may contain, in addition to the above-described polyolefin or polyarylene oxide, a second polymer as long as the properties of the membrane do not change. Examples of the second polymer may include various olefin-based polymers such as poly(4-methylpentene), poly(vinyltrimethylsilane), polystyrene and poly(di-tert-butyl fumarate); aromatic polyethers such as poly(2,6-dimethyl-1,4-phenylene oxide); polyorganosiloxanes such as polydimethylphenylsiloxane and polymethylphenylsiloxane; polyorganosiloxane copolymers such as silphenylene-siloxane copolymer, polycarbonate-polysiloxane copolymer and polysulfone-polysiloxane copolymer; poly(substituted acetylene)s such as poly(tert-butylacetylene) and poly(trimethylsilylpropyne); polyorganophosphazenes such as poly[bis(ethoxy)phosphazene]; polysulfones such as poly(oxy-1,4-phenylenesulfonyl-1,4-phenylene) and poly(oxy-1,4-phenylenesulfonyl-1,4-phenyleneoxy-1,4-phenyleneisopropylidene-1,4-phenylene). The second polymer may be added to the membrane by mixing the second polymer with the polyolefin or polyarylene oxide in the solution, or by laminating the second polymer on or under the thin film of the polyolefin or polyarylene oxide. The content of the second polymer in the gas separation membrane is not limited as long as the properties of the membrane do not change, and usually the content of the second polymer may be less than 50% by weight.

The gas separation membrane of the present invention may be an asymmetric membrane or a composite membrane hereinbelow described in more detail, and may be in any form such as, for example, a flat sheet, hollow fiber and a tube.

The thickness of the gas separation asymmetric membrane of the present invention is preferably 1 to 300 μm, and more preferably 5 to 100 μm, in order to have a practical mechanical strength and sufficient gas permeation flux.

In a preferred mode of the present invention, the gas separation layer is formed on a porous support. The porous support which may be used for supporting the gas separation layer of the present invention preferably has a pore radius of 1 to 500 nm, and more preferably 1 to 100 nm. In order not to be resistant to gas flow, the porous support preferably has an asymmetric structure. The porous support preferably has a gas permeability of not less than 10 m³/m².hr.atm in terms of nitrogen permeation flux. Preferred examples of the material constituting the porous support include porous glasses, sintered metals, ceramics, cellulose ester asymmetric membrane, polyethersulfone asymmetric membrane, polysulfone asymmetric membrane and polyimide asymmetric membrane. Among these, a polysulfone asymmetric membrane is most preferred in view of the sufficient gas permeability and suitable pore radius. In cases in which the gas separation layer is supported on the porous support, the smaller the thickness of the layer, the better, as long as pinholes are not formed, and the thickness of the layer may be as thin as 0.2 μm or less.

In another aspect, the present invention provides a composite membrane wherein the above-described gas separation layer is formed on a first thin layer having a high gas permeability which is formed on the porous support. The porous support which may be used herein may be the same as described above. The first layer excelling in gas permeability which may be interposed between the porous support and the above-described gas separation layer may preferably be made of a polymer having an oxygen permeation coefficient of not less than $1 \times 10^{-8}$ cm³.cm/cm².cmHg.sec. Preferred examples of the polymer which may constitute the first layer include polyorganosiloxanes, crosslinked polyorganosiloxanes, polyorganosiloxane/polycarbonate copolymers, polyorganosiloxane/polyphenylene copolymers, polyorganosiloxane/polystyrene copolymers and poly(trimethylsilylpropyne). Among these, crosslinked polydimethylsiloxane is most preferred since it has good mechanical strength and a high oxygen permeability. A crosslinked polydimethylsiloxane layer may be produced by various methods well-known in the art as described in Japanese Patent Application Nos. 257803/85, 60272/86 and 59269/86, and it may be produced by, for example, the following methods:

(1) A method in which a solution containing a polyorganosiloxane having a silanol group on the end thereof and a silane crosslinking agent or a siloxane crosslinking agent having four or more functional groups in a solvent is applied on the porous support (Japanese Patent Disclosure (Kokai) No. 257803/85).

(2) A method in which a solution containing a polyorganosiloxane having a side chain of aminoalkyl and a polyorganosiloxane having a side chain of isocyanate-modified alkyl in a solvent is applied on the porous support (Japanese Patent Application No. 60272/86).

(3) A method in which a solution containing a polyorganoxiloxane having a side chain of which end is silanol-modified and silane or siloxane crosslinking agent in a solvent is applied on a porous support (Japanese Patent Application No. 59269/86). Although a thinner first layer is preferred, in view of the generation of pinholes, those which are too thin are not preferred. Since the thickness of first layer may be as thin as 0.1 $\mu$m without forming pinholes, it is preferred that the thickness of the first layer be close to 0.1 $\mu$m as much as possible.

The invention will now be described in more detail by way of the following examples thereof. These examples are presented for illustration purpose only and should not be interpreted as restricting the invention in any way.

Before discussing the examples, the methods of measuring membrane properties and evaluating the effects are described.

(1) Gas Permeability and Gas Separation Ability

The oxygen permeation coefficient $PO_2$, the nitrogen permeation coefficient $PN_2$ and separation factor $\alpha$ ($=PO_2/PN_2$) of the sample membranes (dense films) were determined under vacuum at permeate side at 25° C. using a gas permeability measuring apparatus commercially available from YANAGIMOTO MFG. CO., LTD.

Performance of composite membranes were determined by measuring the gas (oxygen or nitrogen) permeation flux using a precision flow rate meter (commercially available from STEC Inc. under the tradename of "SF-101") by setting the pressure at the feed side of the semipermeable membrane to 2 atms and that at the permeate side of the semipermeable membrane to 1 atm.

The gas permeation was evaluated based on the oxygen permeation flux (expressed as $QO_2$, the unit thereof being $m^3/m^2 \cdot hr \cdot atm$) and the gas separation ability was evaluated based on the separation coefficient (expressed as $\alpha$) which is a ratio of the oxygen permeation flux to nitrogen permeation flux (expressed as $QN_2$, the unit thereof being $m^3/m^2 \cdot hr \cdot atm$)

(2) Anti-scratching Property

The gas permeability and the gas separation ability of the sample membranes were determined as described in (1) above. Then the sample membranes were subjected to an anti-scratching test using a stiffness testing machine (manufactured by Daiei Chemical Precision Instruments Mfg. Co., Ltd.) and using as an abrasion material non-woven fabric MF-110 (manufactured by Nippon Vilene). The test was repeated ten times. Thereafter, the gas permeability and the gas separation ability were measured. The evaluation of the anti-scratching property is based on the difference of these values before and after the anti-scratching test.

EXAMPLE 1

In 250 g of anhydrous xylene, 25 g of poly(4-methyl-1-pentene) (commercially available from Mitsui Petrochemical Industries Ltd. under the registered tradename of "TPX MX-001") was heated to dissolve under a nitrogen atmosphere. To this solution, were added 50 g of trimethoxyvinylsilane and then 1.25 g of benzoyl peroxide, and the resulting solution was allowed to react for about 4 hours at 110° C. The thus obtained polymer was purified twice by precipitation from xylene solution with methanol and dried in vacuum to obtain methoxysilane-grafted poly(4-methyl-1-pentene)(I). The silicon content in the graft polymer (I) was 0.13% by weight.

Ten grams of the thus obtained graft polymer (I) and 0.1 g of dibutyltin dilaurate were dissolved in 60 g of cyclohexane, and the resulting solution was cast on a polytetrafluoroethylene plate. By allowing the solution to dry by evaporation at 40° C. for 8 hours in an atmosphere with a relative humidity of 70%, a crosslinked poly(4-methyl-1-pentene) membrane was obtained. The oxygen permeation factor $PO_2$, the nitrogen permeation coefficient $PN_2$, and the separation factor $\alpha$ ($=PO_2/PN_2$) were $1.5 \times 10^{-9}$ $cm^3 \cdot cm/cm^2 \cdot sec \cdot cmHg$, $3.6 \times 10^{-10}$ $cm^3 \cdot cm/cm^2 \cdot sec \cdot cmHg$ and 4.2, respectively.

EXAMPLE 2

In 200 g of cyclohexane, 1 g of the graft polymer (I) synthesized in Example 1 and 10 mg of di-n-butyltin dilaurate were dissolved. This solution was applied on a surface of a polysulfone porous support membrane which had been immersed with water (having an air permeation flux of about 200 $m^3/m^2 \cdot hr \cdot atm$ in dry state), from which surface water had been removed. The applied solution was evaporated under a stream of hot air of 140° C. to obtain a crosslinked poly(4-methyl-1-pentene)/polysulfone composite membrane. The composite membrane had an oxygen permeation flux $QO_2$ of 0.15 $m^3/m^2 \cdot hr \cdot atm$., nitrogen permeation flux $QN_2$ of 0.042 $m^3/m^2 \cdot hr \cdot atm$., and a separation factor $\alpha$ ($=QO_2/QN_2$) of 3.6. Thus, the crosslinked poly(4-methyl-1-pentene) showed an excellent oxygen-enriching property and a good film-formability.

COMPARATIVE EXAMPLE 1

One gram of poly(4-methyl-1-pentene)(commercially available from Mitsui petrochemical Industries, Ltd. under a tradename of "TPX MX-001"; oxygen permeation coefficient $PO_2 = 1.7 \times 10^{-9}$ $cm^3 \cdot cm/cm^2 \cdot sec \cdot cmHg$; $\alpha$ ($=PO_2/PN_2$)=3.9) was dissolved in 200 g of cyclohexane. Using this solution, the same procedure as in Example 2 was repeated to obtain a poly(4-methyl-1-pentene)/polysulfone composite membrane. The separation factor $\alpha$ ($=QO_2/QN_2$) was 1, and thus the membrane did not show an oxygen-enriching property.

EXAMPLE 3

In 70 ml of xylene, 1.4 g of water-curable polypropylene (organosilane-modified polymer, commercially available from Mitsubishi Petrochemical Co., Ltd. under a registered tradename of "Linklon P XPM800H") was dissolved at 140° C. To this solution, 10 mg of dibutyltin dilaurate was added. The resulting solution was cast on a plate and the solvent was evaporated under hot air of 130° C. to obtain a translucent crosslinked polypropylene membrane. The oxygen permeation coefficient $PO_2$ of the membrane was $1.7 \times 10^{-10}$ cm$^3$.cm/cm$^2$.sec.cmHg, and the separation factor $\alpha$ (=$PO_2/PN_2$) was 3.4.

EXAMPLE 4

One gram of a graft polymer (I) obtained in Example 1 was dissolved in 99 g of cyclohexene to obtain a primary solution. This primary solution was diluted with trifluorotrichloroethane to a polymer concentration of 0.1 wt % to prepare a solution to be applied.

On the other hand, 9.5 g of polydimethylsiloxane (number average molecular weight of about 50,000) of which both ends are silanol groups, 0.4 g of tetrakis(2-propanoneoxime)silane and 0.1 g of dibutyltin diacetate were dissolved in cyclohexane to obtain a solution having a solid content of 0.5% by weight. A part of this solution was coated on a polysulfone porous support and the solution was evaporated at 130° C. for 1 minute to obtain a crosslinked siloxane composite membrane, and then the composite membrane was dried at room temperature for 1 hour.

On the surface of the thus obtained crosslinked polydimethylsiloxane, the solution of the graft polymer (I) prepared above was applied with a wet thickness of 20 μm, and the solution was evaporated to obtain a semipermeable composite membrane.

The gas permeation performance and the anti-scratching property of the thus obtained semipermeable composite membrane are shown in Table 1.

EXAMPLE 5

In 250 g of anhydrous xylene, 25 g of poly(4-methyl-1-pentene) (commercially available from Mitsui Petrochemical Industries Ltd. under the registered tradename of "TPX MX-001") was heated to dissolve. To this solution, were added 50 g of maleic anhydride and then 1.25 g of benzoyl peroxide, and the resulting solution was allowed to react for about 4 hours at 110° C. The thus obtained polymer was purified twice by precipitation from xylene solution with methanol and dried in vacuum to obtain maleic anhydride-grafted poly(4-methyl-1-pentene)(II). The content of the maleic anhydride in the graft polymer (II) was about 3% by mol fraction.

One gram of the thus obtained polymer (II) was dissolved in 99 g of cyclohexane to obtain a primary solution. The primary solution was diluted with trifluorotrichloroethane to a polymer concentration of 0.1 wt % to prepare a solution for application. To 100 g of the thus obtained solution for application, 0.1 g of 1,3-bis(3-aminopropyl)tetramethyldisiloxane was added. On the other hand, by the same procedure as in Example 4, a composite membrane comprising a first layer of crosslinked polydimethylsiloxane on a porous support was prepared. On the surface of the first layer, the above-obtained solution for application was applied with a wet thickness of 20 μm to obtain a semipermeable composite membrane.

The gas permeation performance and the anti-scratching property of the thus obtained semipermeable composite membrane are shown in Table 1.

COMPARATIVE EXAMPLE 2

One gram of poly(4-methyl-1-pentene) (commercially available from Mitsui Petrochemical Industries Ltd. under the tradename of "TPX MX-001") was dissolved in 99 g of cyclohexene to obtain a primary solution. This primary solution was diluted with trifluorotrichloroethane to a polymer concentration of 0.1 wt % to prepare a solution for application. On the other hand, by the same procedure as in Example 4, a composite membrane comprising a first layer of crosslinked polydimethylsiloxane on a porous support was prepared. On the surface of the first layer, the above-obtained solution for application was applied with a wet thickness of 20 μm to obtain a semipermeable composite membrane.

The gas permeation performance and the anti-scratching property of the thus obtained semipermeable composite membrane are shown in Table 1.

From Table 1, it can be seen that the semipermeable composite membranes of the present invention have a gas permeability and anti-scratching property which are superior to those of the membrane obtained in the Comparative Examples.

EXAMPLE 6

To the solution of the graft polymer (I) obtained in Example 4, 0.1 g of stannous octanoate was added. This solution was applied by the same manner as in Example 4 to obtain a semipermeable composite membrane.

The gas permeation performance and the anti-scratching property were excellent as shown in Table 1.

EXAMPLE 7

Twenty grams of ethylene/propylene rubber (commercially available from Mitsui Petrochemicals Industries Ltd., under the tradename of "P-0180") was dissolved in 180 g of anhydrous xylene under heat. To this solution, were added 50 g of triethoxyvinyl silane and then 1.25 g of benzoyl peroxide, and the resulting solution was allowed to react for about 4 hours at 110° C. The thus obtained polymer was purified twice by precipitation from xylene solution with methanol, and then dried in vacuum to obtain an ethoxysilane-grafted ethylene/propylene rubber(III). The thus obtained graft polymer (III) had a silicon content of 0.3% by weight.

One gram of the thus obtained graft polymer (III) was dissolved in 99 g of cyclohexane to prepare a primary solution, and the primary solution was diluted with trifluorotrichloroethane to a polymer concentration of 0.1 wt %. To this solution, 0.1 g of dibutyltin acetate was added to obtain a solution for application.

On the other hand, an amino-modified polydimethylsiloxane of the formula:

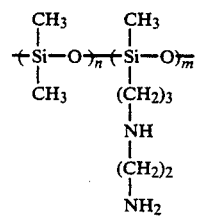

($\frac{m}{n+m} = 0.026$, $\overline{n+m}$ (number average degree of polymerization) = 1600)

was dissolved in trichlorotrifluoroethane to a concentration of 0.1 wt %. On the other hand, an isocyanate-modified polydimethylsiloxane of the formula:

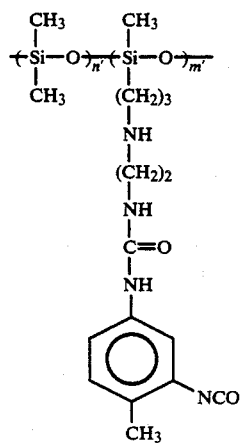

$$\left(\frac{m'}{n' + m'} = 0.026,\right.$$

$\overline{n' + m'}$ (number average degree of polymerization) = 1200)

was dissolved in trichlorotrifluoroethane to a concentration of 0.1 wt %. These two solutions were mixed in a ratio of 1:1 to obtain a solution for application. The solution was applied on a polysulfone porous support in which water had been immersed and from which surface water had been removed, with a wet thickness of 5 μm. After 2 seconds from the application of the solution, the solution was evaporated at 100° C. The solution for application was again applied with a wet thickness of 20 μm and evaporated in the same manner to obtain a composite membrane comprising a first layer of a crosslinked polydimethylsiloxane on a porous support.

The above-obtained solution of the graft polymer (III) was applied on the surface of the first layer of the thus obtained composite membrane with a wet thickness of 20 μm, and the solvent was evaporated to obtain a semipermeable composite membrane.

The gas permeation performance and the anti-scratching property of the thus obtained semipermeable composite membrane are shown in Table 1.

COMPARATIVE EXAMPLE 3

One gram of ethylene/propylene rubber (commercially available from Mitsui Petrochemicals Industries Ltd., under the tradename of "P-0180") was dissolved in 99 g of cyclohexane to prepare a primary solution. The primary solution was diluted with trichlorotrifluoroethane to a polymer concentration of 0.1 wt % to obtain a solution for application. On the other hand, a composite membrane comprising a first layer of crosslinked polydimethylsiloxane on a porous support was prepared in accordance with the procedure in Example 7. On the surface of the first layer of the composite membrane, the above-obtained solution for application of ethylene/propylene rubber was applied with a wet thickness of 20 μm, and was evaporated to obtain a semipermeable composite membrane.

The gas permeation performance and the anti-scratching property of the thus obtained semipermeable composite membrane are shown in Table 1.

TABLE 1

| Examples | Gas Permeation Property before Anti-Scratching Test | | Gas Permeation Property after Anti-Scratching Test | |
|---|---|---|---|---|
| | $QO_2$*[1] | $\alpha$*[2] | $QO_2$*[1] | $\alpha$*[2] |
| Example 4 | 3.1 | 3.1 | 4.0 | 2.7 |
| Comparative Example 2 | 2.8 | 3.0 | 4.5 | 2.4 |
| Example 6 | 3.0 | 3.2 | 3.2 | 3.1 |
| Example 7 | 1.6 | 2.8 | 2.0 | 2.7 |
| Comparative Example 3 | 1.7 | 2.7 | 2.5 | 2.2 |
| Example 5 | 3.0 | 3.1 | 3.1 | 3.0 |

*[1]$QO_2$ = Oxygen Permeation Flux ($m^3/m^2 \cdot hr \cdot atm$)
*[2]$\alpha$ = Separation Factor (= $QO_2/QN_2$)

EXAMPLE 8

In 400 ml of anhydrous tetrahydrofuran, 6.1 g of poly(2,6-dimethyl-1,4-phenylene oxide) was dissolved. To this solution, 8.5 ml of N,N,N',N'-tetramethylethylenediamine and 28 ml of n-butyllithium solution (1.58M) in n-hexane were added and the resulting solution was stirred for 80 minutes. To this solution, was added a mixture of 5.9 ml of trimethylchlorosilane and 1.3 ml of triethoxychlorosilane and the solution was stirred for 1 hour. The thus obtained reaction mixture was poured into 2 liters of methanol, and the precipitated polymer was recovered by filtration. The thus obtained polymer was purified by precipitation from tetrahydrofuran solution with methanol, and was dried to obtain 7.4 g of a polymer (IV). The infrared absorption spectrum of the thus obtained polymer has an absorption originating from trimethylsilyl groups at 1250 $cm^{-1}$, and the proton nuclear magnetic reasonance spectrum showed that trimethylsilyl groups were introduced into 25% of the repeating units, and triethoxysilyl groups were introduced into 4% of the repeating units.

To a 3% solution of this polymer (IV) in chloroform, stannous octanoate was added in the amount of 1% by weight of the polymer. The resulting solution was cast on a polytetrafluoroethylene plate and was left to stand at 50° C., RH80% for 20 hours to form a crosslinked membrane.

The separation factor and the oxygen permeation coefficient of the thus formed crosslinked membrane are shown in Table 2.

COMPARATIVE EXAMPLE 4

A 3% solution of the polymer (IV) in chloroform was casted on a polytetrafluoroethylene plate and was dried at 50° C. to form a non-crosslinked membrane The separation factor and the oxygen permeation coefficient of the thus obtained non-crosslinked membrane are shown in Table 2.

TABLE 2

| Examples | Separation Factor $\alpha$ (= $PO_2/PN_2$) | Oxygen Permeation Coefficient $PO_2$ ($cm^3 \cdot cm/cm^3 \cdot sec \cdot cmHg$) |
|---|---|---|
| Example 8 | 4.7 | $1.7 \times 10^{-9}$ |
| Comparative Example 4 | 4.3 | $2.0 \times 10^{-9}$ |

EXAMPLE 9

One gram of the polymer (IV) obtained in Example 8 was dissolved in 99 g of trifluorotrichloroethane to prepare a primary solution. A diluting solution containing 0.02 g of stannous octanoate in 90 g of trichlorotrifluoroethane was mixed with 10 g of the primary solution to form a solution for application of the polymer concentration of 0.1 wt %. On the other hand, a composite membrane comprising a first layer of a crosslinked polydimethylsiloxane on a porous support was prepared in accordance with Example 4. On the surface of the first layer of the composite membrane, the above-obtained solution for application was applied with a wet thickness of 20 μm and was evaporated to obtain a semipermeable composite membrane.

The gas permeation performance and the anti-scratching property of the thus obtained semipermeable composite membrane are shown in Table 3.

COMPARATIVE EXAMPLE 5

In 400 ml of anhydrous tetrahydrofuran, 6.1 g of poly(2,6-dimethyl-1,4-phenylene oxide) was dissolved. To this solution, 8.5 ml of N,N,N',N'-tetramethylethylenediamine and 28 ml of n-butyllithium solution (1.58M) in n-hexane were added and the resulting solution was stirred for 80 minutes. To this reaction mixture, was added 6.0 ml of trimethylchlorosilane and the solution was stirred for 1 hour. The thus obtained reaction mixture was poured into 2 liters of methanol, and the precipitated polymer was recovered by filtration. The thus obtained polymer was purified by precipitation from tetrahydrofuran with methanol, followed by vacuum drying. Seven grams polymer (V) was obtained.

In 99.9 g of trichlorotrifluoroethane, 0.1 g of the thus obtained polymer was dissolved to prepare a solution for application of a polymer concentration of 0.1% by weight. On the other hand, a composite membrane comprising a first layer of a crosslinked polydimethylsiloxane on a porous support was prepared in accordance with Example 4. On the surface of the first layer of the composite membrane, the above-obtained solution for application of a polymer concentration of 0.1% by weight was applied with a wet thickness of 20 μm, and was evaporated to obtain a semipermeable composite membrane.

The gas permeation performance and the anti-scratching property are shown in Table 3.

EXAMPLE 10

One gram of the polymer (IV) obtained in Example 8 was dissolved in 99 g of cyclohexane to prepare a primary solution. Ten grams of the primary solution was diluted with 90 g of trifluorotrichloroethane to prepare a solution for application of a polymer concentration of 0.1% by weight. On the other hand, a composite membrane comprising a first layer of a crosslinked polydimethylsiloxane on a porous support was prepared in accordance with the procedure in Example 4. On the surface of the first layer of the composite membrane, the above-obtained solution for application was applied with a thickness of 30 μm to obtain a semipermeable composite membrane.

The gas permeation performance and the anti-scratching property of the thus obtained semipermeable composite membrane are shown in Table 3.

From this table, it can be seen that the semipermeable composite membrane of the present invention is superior to that obtained in the comparative example in gas permeability and anti-scratching property.

TABLE 3

| Examples | Gas Permeation Property before Anti-Scratching Test | | Gas Permeation Property after Anti-Scratching Test | |
|---|---|---|---|---|
| | $QO_2$*[1] | $\alpha$*[2] | $QO_2$*[1] | $\alpha$*[2] |
| Example 9 | 3.4 | 3.1 | 3.5 | 3.0 |
| Comparative Example 5 | 3.3 | 3.0 | 4.5 | 2.4 |
| Example 10 | 2.6 | 3.3 | 3.3 | 2.9 |

*[1] $QO_2$ = Oxygen Permeation Flux ($m^3/m^2 \cdot hr \cdot atm.$)
*[2] $\alpha$ = Separation Factor (= $QO_2/QN_2$)

We claim:

1. A gas separation membrane consisting essentially of a crosslinked polyolefin or a crosslinked polyarylene oxide, which gas separation membrane is produced by evaporating a solution containing polyolefin or a polyarylene oxide having an active functional group which can autogenically form crosslinking sites therebetween.

2. The gas separation membrane of claim 1, wherein the crosslinking sites are formed of oligosiloxane bonds.

3. The gas separation membrane of claim 2, wherein the oligosiloxane bond is expressed by the formula:

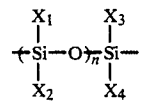

wherein $X_1$, $X_2$, $X_3$ and $X_4$ independently represents —OSi—, alkyl, aryl, alkoxy, acetoxy, oxime or hydroxyl and n represents an integer of 1 to 3.

4. The gas separation membrane of claim 1, wherein the polyolefin is composed of olefin units containing 2 to 18 carbon atoms.

5. The gas separation membrane of claim 1, wherein the polyolefin is mainly composed of α-olefin units.

6. The gas separation membrane of claim 1, wherein the polyolefin comprises at least one of polypropylene and poly(4-methylpentene).

7. The gas separation membrane of claim 1, wherein the polyarylene oxide is expressed by the formula:

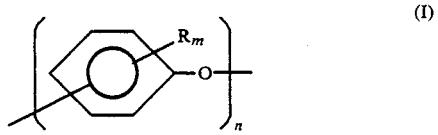

wherein m represents an integer of 1–3, n represents an integer of not less than 75, R represents, the same or different, alkyl, substituted alkyl, phenyl, substituted phenyl, halogen, alkoxy, alkenyl, alkynyl or amino).

8. The gas separation membrane of claim 7, wherein the polyarylene oxide consists essentially of poly(2,6-dimethyl-1,4-phenylene oxide).

9. The gas separation membrane of claim 1, wherein the polyarylene oxide has a non-crosslinking silicon-containing group selected from the group consisting of organosilyl, organosiloxane and organosilalkylene.

10. The gas separation membrane of claim 1, wherein the active functional group is an active silyl group.

11. The gas separation membrane of claim 10, wherein the active silyl group is selected from the group consisting of alkoxysilyl, acetoxysilyl and oximesilyl.

12. The gas separation membrane of claim 1, further comprising a porous support on which the gas separation membrane is laminated.

13. The gas separation membrane of claim 1, wherein the solution contains a crosslinking catalyst selected from the group consisting of organotin, a salt of carboxylic acid, amine and titannic ester.

14. The gas separation membrane of claim 1, which is an asymmetric membrane.

15. A composite gas separation membrane comprising:
   a porous support;
   a first gas permeable layer formed on the porous support; and
   a gas separation layer consisting essentially of the gas separation membrane of claim 1.

16. The gas separation membrane of claim 1, which has a thickness of 1 to 300 $\mu$m.

* * * * *